Figure 1:
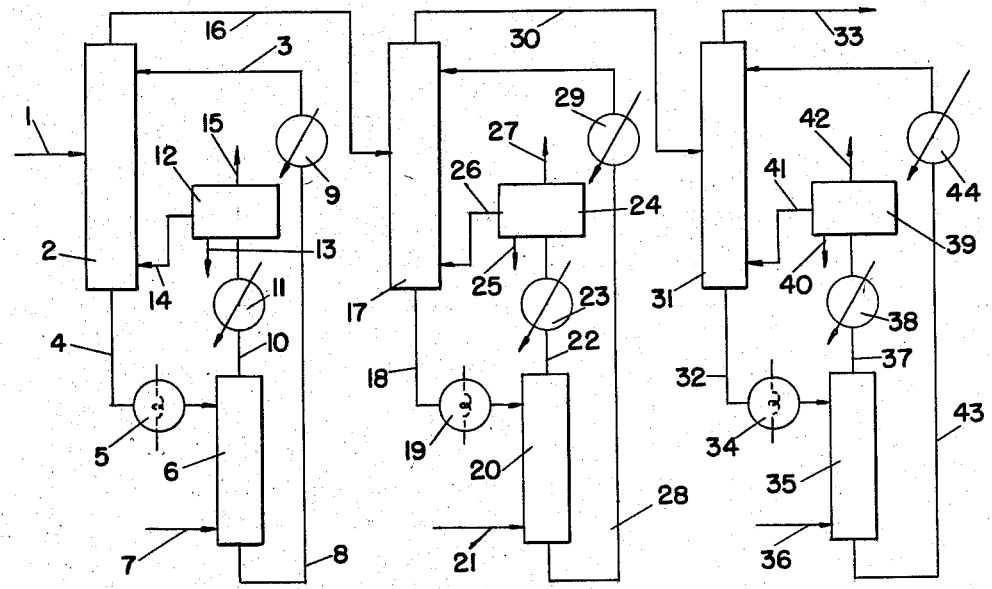

2,880,253

SEPARATION OF ISOMERIC C₈ AROMATIC HYDROCARBONS BY SELECTIVE SULFONATION

James L. Jezl, Swarthmore, and Louise D. Hague, Villanova, Pa., assignors to Sun Oil Company, Philadelphia, Pa., a corporation of New Jersey Application September 12, 1956, Serial No. 609,425

18 Claims. (Cl. 260—674)

This invention relates to the separation of mixtures of isomeric xylenes into relatively pure isomer fractions, and more particularly to a continuous process for effecting such separation by means of selective sulfonation under hydrolysis conditions.

Mixtures of the isomeric xylenes, usually mixed with a small amount of ethyl benzene, are recovered from coal-tar distillate and from hydroforming processes. This xylene mixture, as such, is of value only as a solvent, and in order to realize the greatest value commercially from the mixture, it is necessary to separate it into relatively pure isomeric fractions: para xylene for the manufacture of terephthalic acid; ortho xylene for the manufacture of phthalic anhydride; and ethyl benzene for the manufacture of styrene. The meta xylene at present has no extensive commercial use except as a low-priced solvent. Nevertheless, it is desired to recover this isomer in relatively pure form in order to minimize the losses of the other higher priced isomers.

In prior practice it has been customary to subject the mixed xylenes to superfractionation to recover ortho xylene as a bottoms product, and a mixture of para xylene and meta xylene as an overhead. Since there is only a difference of about 5° C. between the boiling point of ortho xylene and the next lower boiling isomer, expensive fractionating equipment having a large number of theoretical plates is required in order to effect the required separation. In addition, a high reflux ratio is required, which imposes a high heat load on the process.

The mixture of para and meta xylenes taken overhead from the superfractionation is then, according to present commercial practice, diluted with methanol, and chilled to precipitate para xylene crystals which are removed by filtration. While chilling produces para xylene of higher purity, there is a considerable loss of para xylene, since it forms a eutectic mixture with meta xylene containing 12% para xylene and 88% meta xylene. Consequently, the para xylene component of the eutectic cannot be recovered by crystallization. Since a typical coal-tar distillate contains para xylene and meta xylene in a ratio of 24:60, while a typical reformer xylene mixture contains the isomers in a ratio of 23:54, it is apparent that the theoretical recovery of para xylene from such mixtures is only of the order of 65–70%, and in practice some 40% of the para xylene is lost in the crystallization step.

In an effort to reduce the loss of para xylene, it has in the past been proposed to effect a separation of mixtures of meta and para xylene by taking advantage of the fact that they are sulfonated at different rates, and that the hydrolysis of the sulfonic acids of the isomers may be effected at different temperatures, to bring about a fractional sulfonation and/or hydrolysis of the mixture. Thus, at normal sulfonation temperatures, meta xylene is more readily sulfonated than para xylene, so that it has been suggested that the mixture is sulfonated at 80–100° C. with 80–98% sulfuric acid for a period of time sufficient to effect only a partial sulfonation, whereby to obtain an unsulfonated fraction having a greater para-meta ratio in order to reduce loss of para xylene to the eutectic. In our experimental work, we have found that if a mixture of coal-tar xylenes having a para-meta ratio of 24:60 is sulfonated with 80% sulfuric acid in a mol ratio of acid to xylenes of 5.3 to 1, at 100° C. for 9 minutes, the unsulfonated xylenes will have a para-meta ratio of 45:46, and only 2% of the para will be lost to the sulfonation reaction. If the unsulfonated residue is chilled, about 80% of the para xylene charged to the process can be recovered. Longer sulfonation times are undesirable because losses of para xylene to sulfonic acids become excessive, and the total recovery will be less even though less is lost to the eutectic.

An alternative method of xylene separation by sulfonation techniques proposed in the prior art is to completely sulfonate the entire mixture and then to hydrolyze the mixture of sulfonic acids under mild conditions in order to selectively hydrolyze the meta xylene sulfonic acid, while hydrolyzing only a minor fraction of the para xylene. By so proceeding it is possible to hydrolyze about 91% of the meta xylene sulfonic acid while hydrolyzing only about 11% of the para xylene sulfonic acid. Further hydrolysis to completely remove the meta isomer is impractical since losses due to hydrolysis of the para isomer become excessive. The acid solution is then chilled to precipitate crystalline para xylene sulfonic acid, which is recovered by filtration and hydrolyzed to yield para xylene of 95+% purity in a yield of about 80% of that originally charged to the process.

So far as we are aware, processes using the sulfonation technique for the separation of xylenes have not gone into commercial practice for the reason that the added plant and processing costs inherent in the processes do not pay for the greater yield of para xylene recovered in the sulfonation processes over that recovered in the conventional crystallization process. This is because there is always a considerable concentration of meta xylene present in the step in which the para xylene is separated, and consequently, the amount which can be recovered without excessive contamination by meta xylene is limited.

It is an object of this invention to provide a process for the separation of mixed xylenes in which para xylene of high purity may be obtained in yields approaching theoretical.

We have now discovered that the rates of sulfonation and hydrolysis of the various xylene isomers are remarkably sensitive to small changes in temperature and acid strength, and if the conditions are properly adjusted, it is possible to carry meta xylene, ordinarily believed to be the most easily sulfonatable isomer, through the process substantially unsulfonated, while sulfonating the other isomers in separate stages, removing them as the sulfonic acids, and regenerating them by hydrolysis. In this manner the isomers may be recovered in practically quantitative yield uncontaminated by meta xylene, since this latter material is not present in any substantial quantity in the zones in which the isomers are regenerated.

In general our process consists in passing a mixed xylene feed to a first sulfonation zone in which the conditions of acid strength and temperatures are such that in the case of meta xylene and ethyl benzene the rate of hydrolysis of their sulfonic acids is faster than the rate of sulfonation; the rate of sulfonation of ortho xylene is greater than the rate of hydrolysis; and para xylene, which is more resistant to sulfonation than the other isomers, is virtually unattacked by the acid. These conditions are: acid strength of 70–75% and temperature of 125–135° C., the lower acid strength being used with the higher temperature. Under these conditions, any sulfonic acids formed by contact of meta xylene or ethyl benzene with the acid will be hydrolyzed so that they will appear only transiently in the sulfonation zone. The ortho xylene, which is readily sulfonatable at these conditions, is not readily hydrolyzed, and is withdrawn from the sulfonation zone along with the acid as ortho xylene sulfonic acid. The para xylene content of the mixture is resistant to sulfonation at these acid strengths, and is withdrawn from the sulfonation zone unchanged in admixture with meta xylene and ethyl benzene.

The mixture of meta xylene, para xylene and ethyl benzene is then passed to a second sulfonating zone in which it is contacted with acid of 75–80% strength at a temperature of 130–140° C., either the acid strength or the temperature being higher than in the previous step. While the higher strength acid is more conducive to sulfonation of the meta xylene and ethyl benzene than the acid used in the first sulfonation zone, since the reaction velocity of hydrolysis increases by about three times for each 10° C. rise in temperature, hydrolysis will still prevail over sulfonation, and the meta xylene and ethyl benzene will be carried through this zone virtually unattacked. Para xylene, however, is easily sulfonated and not easily hydrolyzed at these acid strengths and temperatures, so that it is converted to para xylene sulfonic acid and is removed from the zone along with the acid.

The mixture of meta xylene and ethyl benzene is then passed to a third sulfonating zone where it is contacted again with acid of 75–80% strength, but this time at a temperature of from 115° C. to 125° C. At these temperatures, the rate of hydrolysis of meta xylene sulfonic acid will still prevail over the rate of sulfonation, but in the case of ethyl benzene, the reverse will be true. The meta xylene may therefore be removed largely unreacted from this stage, while ethyl benzene is recovered as ethyl benzene sulfonic acid.

In order that those skilled in the art may more fully appreciate the nature of our invention and the manner in which it is carried out, an example thereof will be described in connection with Fig. 1 of the accompanying drawing, which is a diagrammatic flow sheet of one embodiment of the process of this invention.

A mixed xylene fraction obtained from the catalytic reforming of a straight run gasoline, and comprising 19% para xylene, 45% meta xylene, 21% ortho xylene, 10% ethyl benzene and 5% saturates is passed through line 1 to sulfonation tower 2, in which it is countercurrently contacted at an average temperature of 130° C. with sulfuric acid of 73% concentration introduced through line 3 in a molar ratio of acid to hydrocarbon of 4:1. Tower 2 is provided with interior baffles or other mixing devices to insure adequate mixing of the charge and acid in their passage through the tower. In tower 2, the ortho xylene will react to form ortho xylene sulfonic acid, which dissolves in the acid and is removed from tower 2 through line 4. The sulfuric-sulfonic acid mixture is then passed through heat exchanger 5, in which its temperature is raised to 150° C., at which temperature ortho xylene sulfonic acid is readily hydrolyzed, and thence to hydrolyzer 6, in which it is contacted with steam introduced through line 7. The steam is used in an amount and at a temperature such that the bottom of the hydrolyzer 6 is maintained at a temperature of 176° C. The steam serves a threefold purpose. By maintaining the bottoms temperature it insures that the strength of the recycle acid is maintained at 73%; on its way up the hydrolyzer it will, as it cools, dilute the acid in the upper part of the hydrolyzer to aid hydrolysis, and finally it helps to sweep the ortho xylene produced by hydrolysis out of the hydrolyzer. It also helps to maintain a temperature gradient in the tower to insure that the last traces of sulfonic acid which are carried down the tower by the sulfuric acid are subjected to a sufficiently high temperature to complete the hydrolysis reaction.

Sulfuric acid of 73% strength is taken from hydrolyzer 6 through line 8 through cooler 9 in which its temperature is reduced to 130° C., from which it is returned to tower 2 through line 3. Ortho xylene and steam are taken off hydrolyzer 6 through line 10, are condensed in condenser 11, and are passed to separator 12, from which water is removed through line 13. A portion of the ortho xylene separated is returned to tower 2 as reflux through line 14, while the balance is taken off to storage through line 15.

The overhead from tower 2, comprising meta xylene, para xylene and ethyl benzene, is taken through line 16 and is passed to a second sulfonation tower 17, in which it is contacted with 78% sulfuric acid at a temperature of 140° C. Acid of this strength will sulfonate the para xylene content of the feed, while the higher temperature, as compared to the temperature in tower 2, will insure hydrolysis of any sulfonic acids of meta xylene or ethyl benzene as soon as they are formed, even at the higher acid strength. A solution of para xylene sulfonic acid is withdrawn from tower 17 through line 18, passed through heater 19 in which its temperature is raised to 150° C., and sent to hydrolysis tower 20, in which it is contacted with steam introduced through line 21. The steam is introduced at a temperature and in a quantity such as to maintain the temperature at the bottom of tower 20 at 196° C., in order to maintain the acid leaving tower 20 at 78% strength. At temperatures between 150° C. and 196° C., para xylene sulfonic acid is readily hydrolyzed to para xylene and sulfuric acid. Steam and para xylene vapors are taken overhead from tower 20 through line 22, and are passed through condenser 23 to separator 24 in which the condensate separates into an upper para xylene layer and a lower water layer, which is withdrawn through line 25. A portion of the para xylene is returned through line 26 to tower 17 as reflux, while the balance is sent to storage through line 27. Sulfuric acid of 78% strength is withdrawn through line 28, passed through cooler 29, in which its temperature is reduced to 140° C., and is returned to the top of tower 17.

The overhead from tower 17, which is a mixture of meta xylene and ethyl benzene together with the feed saturates, is taken through line 30 to sulfonation tower 31, in which it is contacted with 75% sulfuric acid at a temperature of 120° C. At this lower temperature and acid strength, the rate of sulfonation of ethyl benzene is greater than the rate of hydrolysis of its sulfonic acid, so that the ethyl benzene content of the feed to tower 31 will be converted to ethyl benzene sulfonic acid, which is removed as a solution in sulfuric acid through line 32. The temperature is still sufficiently high, however, to cause hydrolysis of meta xylene sulfonic acid to prevail over sulfonation of meta xylene, so that the meta xylene content of the feed will pass through tower 31 largely unchanged, and will be recovered and sent to storage through line 33.

The solution of ethyl benzene sulfonic acid in sulfuric acid withdrawn from tower 31 through line 32 is passed through heater 34, in which its temperature is raised to 140° C., and is sent to hydrolysis tower 35, in which it is contacted with steam introduced through line 36. The temperature and quantity of steam so introduced is regulated to maintain the temperature at the bottom of tower 35 at 182° C., in order to maintain an acid strength of 75%. At temperatures between 140° C. and 182° C., ethyl benzene sulfonic acid is readily hydrolyzed. Ethyl benzene and steam are taken overhead from tower 35 through line 37 and are passed through condenser 38 to separator 39, from which water is discarded through line 40. A portion of the ethyl benzene is returned to sulfonation tower 31 as reflux through line 41, while the balance is taken to storage through line 42. Sulfuric acid of 75% strength is withdrawn from tower 35 through line 43, is passed through cooler 44, in which its temperature is reduced to 120° C., after which it is returned to sulfonation tower 31.

Figure 2:
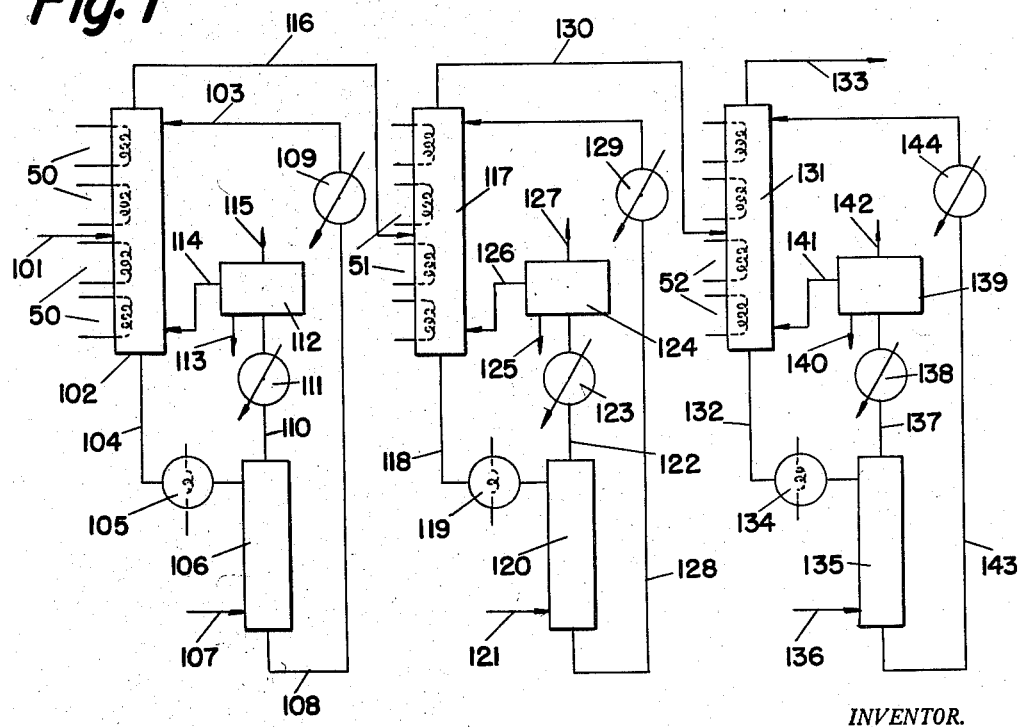

While the foregoing example illustrates the invention in its basic form, utilizing the least expensive equipment, an improved embodiment is illustrated in Fig. 2 of the drawing. In this embodiment of the invention, the processing steps are identical with those of the embodiment of Fig. 1 with the exception that a temperature gradient is maintained in the sulfonators. As illustrated, heating coils 50 are placed in sulfonation tower 102. When these heating coils are employed, the acid entering sulfonation tower 102 through line 103 should be at a somewhat lower temperature than the lower limit of the range of operating temperatures given above for each sulfonation step, and the temperature of the solution of sulfonic acids leaving each sulfonator should be somewhat higher than the upper limit of these operating temperatures. In any event, the feed should be introduced at a point at which the temperature is within the optimum range for the particular sulfonation being carried out. For example, in sulfonation tower 102, a temperature of 120° C. is maintained at the top of the tower, and a temperature of 140° C. is maintained at the bottom of the tower. While at the lower temperature in the top of the tower some meta xylene sulfonic acid may be formed and carried down the tower by the acid, this is of no consequence, since it will be fully hydrolyzed at the higher temperatures prevailing in the lower portion of the tower. The lower temperature at the top of the tower will simultaneously insure against any loss of ortho xylene to hydrolysis reactions therein. While some of the ortho xylene sulfonic acids may be hydrolyzed at the bottom of the tower, they will be resulfonated at the lower temperatures prevailing in the upper part of the tower, so that there will be no ultimate loss to hydrolysis. In effect, the temperature gradient in the tower provides a highly effective internal reflux to assure the recovery of highly purified fractions in maximum yields.

Similarly, sulfonation tower 117 which is equipped with heating coils 51 should be operated at a top temperature of about 125° C., and at a bottom temperature of about 145° C., and sulfonation tower 131, equipped with heating coils 52, should be operated at a top temperature of 110° C. and a bottom temperature of 130° C. Since, as stated above, the only difference between the process of Fig. 1 and Fig. 2 is the incorporation of a temperature gradient in the sulfonators, it is not believed to be necessary to described the process of Fig. 2 in detail, except to note that the numerals 101, 102, etc., in Fig. 2 correspond to identical lines and equipment 1, 2, etc., in Fig. 1.

The molar ratio of acid to feed in each sulfonator is of some importance. It should be such that there is no more than about 5% dilution of the acid during the sulfonation reaction due to removal of acid and formation of water; otherwise a complete sulfonation of the desired component will be difficult to obtain. A 6:1 molar ratio of acid to the isomer which is to be recovered as the sulfonic acid in each sulfonator will meet this requirement, but preferably the ratio should be as high as possible, consistent with economical operation, say from 10:1 to 20:1, so as to maintain the acid strength as nearly as possible at the optimum strength for the particular sulfonation.

In the drawings, the process has been illustrated schematically, and certain process equipment such as pumps, etc., have been omitted. The equipment required will, however be apparent to those skilled in the art. In addition, means, not shown, will be required to maintain the various process streams at the appropriate temperatures.

We claim:

1. A process for recovering ortho xylene which comprises contacting a mixture of isomeric xylenes comprising ortho xylene with sulfuric acid of 70 to 75% strength at a temperature varying inversely with the strength of the acid in a manner such that when the acid strength is 70% the temperature is about 135° C., and when the acid strength is 75% the temperature is about 125° C., separating a solution of ortho xylene sulfonic acid in sulfuric acid, heating the solution to a hydrolyzing temperature of at least about 150° C., hydrolyzing the ortho xylene sulfonic acid, and recovering ortho xylene.

2. A continuous process for recovering ortho xylene which comprises charging a feed stock comprising ortho xylene and other isomeric xylenes to a sulfonation tower, countercurrently contacting the feed stock therein with sulfuric acid of 70 to 75% strength in a molar ratio of sulfuric acid to ortho xylene of at least 6:1 at a temperature varying inversely with the strength of the acid in a manner such that when the acid strength is 70% the temperature is about 135° C. and when the acid strength is 75% the temperature is about 125° C., recovering an overhead product from the sulfonation tower consisting of feed stock depleted in ortho xylene, recovering as a bottoms product a solution of ortho xylene sulfonic acid in sulfuric acid, heating the solution to a hydrolyzing temperature of at least about 150° C., hydrolyzing the ortho xylene sulfonic acid, and recovering ortho xylene as a hydrolysis product.

3. The process according to claim 2 in which a temperature gradient is maintained in the sulfonation tower ranging from about 120° C. at the top of the tower to about 140° C. at the bottom of the tower.

4. A process for recovering para xylene which comprises contacting a mixture of para xylene with at least one isomeric xylene other than ortho xylene with sulfuric acid of 75 to 80% strength at a temperature varying inversely with the strength of the acid in a manner such that when the acid strength is 80% the temperature is about 130° C. and when the acid strength is 75% the temperature is about 140° C., separating a solution of para xylene sulfonic acid in sulfuric acid, heating the solution to a hydrolyzing temperature of at least 150° C., hydrolyzing the para xylene sulfonic acid, and recovering para xylene.

5. A continuous process for recovering para xylene which comprises charging a feed stock comprising para xylene and at least one isomeric xylene other than ortho xylene to a sulfonation tower, countercurrently contacting the feed stock therein with sulfuric acid of 75 to 80% strength in a molar ratio of acid to para xylene of at least 6:1, at a temperature varying inversely with the strength of the acid in a manner such that when the acid strength is 80% the temperature is about 130° C. and when the acid strength is 75% the temperature is about 140° C., recovering an overhead product from the sulfonation tower consisting of feed stock depleted in para xylene, recovering as a bottoms product a solution of para xylene sulfonic acid in sulfuric acid, heating the solution to a hydrolyzing temperature of at least 150° C., hydrolyzing the para xylene sulfonic acid, and recovering para xylene as a hydrolysis product.

6. The process according to claim 5 in which a temperature gradient is maintained in the sulfonation tower ranging from about 125° C. at the top of the tower to about 145° C. at the bottom of the tower.

7. A process for separating meta xylene from ethyl benzene which comprises contacting a feed stock consisting essentially of meta xylene and ethyl benzene with sulfuric acid of 75 to 80% strength at a temperature varying inversely with the strength of the acid in a manner such that when the acid strength is 80% the temperature is about 115° C. and when the acid strength is 75% the temperature is about 125° C., separating unreacted feed stock enriched in meta xylene, separating a solution of ethyl benzene sulfonic acid in sulfuric acid, heating the solution to a hydrolyzing temperature of at least 140° C., hydrolyzing the ethyl benzene sulfonic acid and recovering ethyl benzene from the hydrolysis products.

8. A continuous process for separating meta xylene from ethyl benzene which comprises charging a feed stock consisting essentially of meta xylene and ethyl benzene to a sulfonation tower, countercurrently contacting the feed stock therein with sulfuric acid of 75 to 80% strength in a molar ratio of acid to ethyl benzene of at least 6:1, at a temperature varying inversely with the strength of the acid in a manner such that when the acid strength is 80% the temperature is about 125° C. and when the acid strength is 75% the temperature is about 115° C., recovering an overhead product from the sulfonation tower enriched in meta xylene, recovering as a bottoms product a solution of ethyl benzene sulfonic acid in sulfuric acid, heating the solution to a hydrolyzing temperature of at least 140° C., hydrolyzing the sulfonic acid content of the solution, and recovering a product enriched in ethyl benzene from the hydrolysis products.

9. The process according to claim 8 in which a temperature gradient is maintained in the sulfonation tower ranging from about 110° C. at the top of the tower to about 130° C. at the bottom of the tower.

10. A process for recovering ortho xylene and para xylene which comprises contacting a feed stock comprising ortho xylene, para xylene and at least one other $C_8$ hydrocarbon selected from the group consisting of meta xylene and ethyl benzene with sulfuric acid of 70 to 75% strength at a temperature varying inversely with the acid strength in a manner such that when the acid strength is 75% the temperature is about 125° C. and when the acid strength is 70% the temperature is about 135° C., separating unreacted feed stock and a solution of ortho xylene sulfonic acid in sulfuric acid, contacting the unreacted feed stock with sulfuric acid of 75 to 80% strength at a temperature varying inversely with the acid strength in a manner such that when the acid strength is 80% the temperature is about 130° C. and when the acid strength is 75% the temperature is about 140° C., separating a solution of para xylene sulfonic acid in sulfuric acid, separately heating each sulfonic acid solution to a hydrolyzing temperature of at least 150° C., hydrolyzing the sulfonic acids, and separately recovering ortho xylene and para xylene from the products of hydrolysis.

11. A continuous process for recovering ortho xylene and para xylene which comprises charging a feed stock comprising ortho xylene, para xylene, and at least one other $C_8$ hydrocarbon selected from the group consisting of meta xylene and ethyl benzene to a first sulfonation tower, countercurrently contacting the feed stock therein with sulfuric acid of 70 to 75% strength in a molar ratio of acid to ortho xylene of at least 6:1, at a temperature varying inversely with the acid strength in a manner such that when the acid strength is 75% the temperature is about 125° C. and when the acid strength is 70% the temperature is about 135° C., recovering an overhead product from the first sulfonation tower consisting of feed stock depleted in ortho xylene, recovering as a bottoms product from the first sulfonation tower a solution of ortho xylene sulfonic acid in sulfuric acid, passing the overhead product to a second sulfonation tower, countercurrently contacting it therein with sulfuric acid of 75 to 80% strength, in a molar ratio of acid to para xylene of at least 6:1 at a temperature varying inversely with the acid strength in a manner such that when the acid strength is 80% the temperature is about 130° C. and when the acid strength is 75% the temperature is about 140° C., separating as a bottoms product from the second sulfonation tower a solution of para xylene sulfonic acid in sulfuric acid, separately heating each bottoms product to a hydrolyzing temperature of at least 150° C., hydrolyzing the sulfonic acids, and separately recovering ortho xylene and para xylene from the hydrolysis products.

12. The process according to claim 11 in which a temperature gradient is maintained in the first sulfonation tower ranging from about 120° C. at the top of the tower to about 140° C. at the bottom of the tower, and in which a temperature gradient is maintained in the second sulfonation tower ranging from about 125° C. at the top of the tower to about 145° C. at the bottom of the tower.

13. A process for separating para xylene, meta xylene and ethyl benzene which comprises contacting a feed stock consisting essentially of para xylene, meta xylene, and ethyl benzene with sulfuric acid of 75 to 80% strength at a temperature varying inversely with the strength of the acid in a manner such that when the acid strength is 80% the temperature is about 130° C. and when the acid strength is 75% the temperature is about 140° C., separating unreacted feed stock and a solution of para xylene sulfonic acid in sulfuric acid, heating the solution to a hydrolyzing temperature of at least 150° C., hydrolyzing the para xylene sulfonic acid, recovering para xylene from the hydrolysis products, contacting the unreacted feed stock with sulfuric acid of 75 to 80% strength at a temperature varying inversely with the strength of the acid such that when the acid strength is 80% the temperature is about 115° C. and when the acid strength is 75% the temperature is about 125° C., separating unreacted feed stock rich in meta xylene, separating a solution of ethyl benzene sulfonic acid in sulfuric acid, heating the solution to a hydrolyzing temperature of at least 140° C., hydrolyzing the ethyl benzene sulfonic acid, and recovering ethyl benzene from the hydrolysis products.

14. A continuous process for separating para xylene, meta xylene, and ethyl benzene which comprises charging a feed stock consisting essentially of para xylene, meta xylene, and ethyl benzene to a first sulfonation tower, countercurrently contacting the feed stock therein with sulfuric acid of 75 to 80% strength, in a molar ratio of acid to para xylene of at least 6:1, at a temperature varying inversely with the strength of the acid in a manner such that when the acid strength is 80% the temperature is about 130° C. and when the acid strength is 75% the temperature is about 140° C., recovering an overhead product from the first sulfonation tower consisting of feed stock substantially depleted in para xylene, and a bottoms product comprising para xylene sulfonic acid solution in sulfuric acid, heating the bottoms product to a hydrolyzing temperature of at least 150° C., hydrolyzing the para xylene sulfonic acid, recovering para xylene from the hydrolysis products, passing the overhead product from the first sulfonation tower to a second sulfonation tower, countercurrently contacting it therein with sulfuric acid of 75 to 80% strength, in a molar ratio of acid to ethyl benzene of at least 6:1, at a temperature varying inversely with the strength of the acid such that when the acid strength is 80% the temperature is about 115° C. and when the acid strength is 75% the temperature is about 125° C., recovering as an overhead product a meta xylene concentrate, recovering a bottoms product comprising a solution of ethyl benzene sulfonic acid in sulfuric acid, heating the latter bottoms product to a hydrolyzing temperature of at least 140° C., hydrolyzing the ethyl benzene sulfonic acid and recovering an ethyl benzene concentrate from the hydrolysis products.

15. The process according to claim 14 in which a temperature gradient is maintained in the first sulfonation tower ranging from about 125° C. at the top of the tower to about 145° C. at the bottom of the tower, and in which a temperature gradient is maintained in the second sulfonation tower ranging from about 110° C. at the top of the tower to about 130° C. at the bottom of the tower.

16. A process for separating mixed xylene isomers which comprises contacting a feed stock comprising ortho xylene, para xylene, ethyl benzene and meta xylene in a first contacting zone with sulfuric acid of 70 to 75% strength at a temperature varying inversely with the strength of the acid in a manner such that when the acid strength is 70% the temperature is about 135° C. and when the acid strength is 75% the temperature is about 125° C., separating unreacted feed stock substantially depleted in ortho xylene, and a solution of ortho xylene sulfonic acid in sulfuric acid, contacting the unreacted feed stock in a second contacting zone with sulfuric acid of 75 to 80% strength at a temperature varying inversely with the strength of the acid in a manner such that when the acid strength is 75% the temperature is about 140° C. and when the acid strength is 80% the temperature is about 130° C., separating a further quantity of feed stock substantially depleted in ortho xylene and para xylene, and a solution of para xylene sulfonic acid in sulfuric acid, separately heating the solutions of ortho xylene sulfonic acid and para xylene sulfonic acid to a hydrolyzing temperature of at least 150° C., hydrolyzing the sulfonic acids and recovering ortho xylene and para xylene from the hydrolysis products, contacting the unreacted feed stock recovered from the second contacting zone with sulfuric acid of 75 to 80% strength at a temperature varying inversely with the acid strength in a manner such that when the acid strength is 75% the temperature is about 125° C. and when the acid strength is 80% the temperature is about 115° C., separating a meta xylene concentrate and a solution of ethyl benzene sulfonic acid in sulfuric acid, heating the solution to a hydrolyzing temperature of at least 140° C., hydrolyzing the ethyl benzene sulfonic acid, and recovering an ethyl benzene concentrate from the hydrolysis products.

17. A continuous process for separating mixed xylene isomers which comprises charging a feed stock comprising ortho xylene, para xylene, meta xylene and ethyl benzene to a first sulfonation tower, countercurrently contacting the feed stock therein with sulfuric acid of 70 to 75% strength in a molar ratio of acid to ortho xylene of at least 6:1, at a temperature varying inversely with the strength of the acid in a manner such that when the acid strength is 70% the temperature is about 135° C. and when the acid strength is 75% the temperature is about 125° C., recovering an overhead product from the first sulfonation tower consisting of feed stock substantially depleted in ortho xylene, recovering as a bottoms product from the first sulfonation tower a solution of ortho xylene sulfonic acid in sulfuric acid, heating the solution to a hydrolyzing temperature of at least 150° C., hydrolyzing the ortho xylene sulfonic acid and recovering ortho xylene from the reaction products, passing the overhead from the first sulfonation tower to a second sulfonation tower, countercurrently contacting it therein with sulfuric acid of 75 to 80% strength in a molar ratio of acid to para xylene of at least 6:1, at a temperature varying inversely with the strength of the acid in a manner such that when the acid strength is 75% the temperature is about 140° C. and when the acid strength is 80% the temperature is about 130° C., recovering an overhead product from the second sulfonation tower consisting of feed stock substantially depleted in ortho xylene and para xylene, recovering as a bottoms product a solution of para xylene sulfonic acid in sulfuric acid, heating the solution to a hydrolyzing temperature of at least 150° C., hydrolyzing the para xylene sulfonic acid and recovering para xylene from the hydrolysis products, passing the overhead product from the second sulfonation tower to a third sulfonation tower, countercurrently contacting it therein with sulfuric acid of 75 to 80% strength, in a molar ratio of acid to ethyl benzene of at least 6:1, at a temperature varying inversely with the acid strength in a manner such that when the acid strength is 75% the temperature is about 125° C. and when the acid strength is 80% the temperature is about 115° C., recovering as an overhead product a meta xylene concentrate, recovering a bottoms product comprising a solution of ethyl benzene sulfonic acid in sulfuric acid, heating the solution to a hydrolyzing temperature of at least 140° C., hydrolyzing the ethyl benzene sulfonic acid, and recovering an ethyl benzene concentrate from the hydrolysis products.

18. The process according to claim 17 in which a temperature gradient is maintained in the first sulfonation tower ranging from about 120° C. at the top of the tower to about 140° C. at the bottom of the tower, in which a temperature gradient is maintained in the second sulfonation tower ranging from about 125° C. at the top of the tower to about 145° C. at the bottom of the tower, and in which a temperature gradient is maintained in the third sulfonation tower ranging from about 110° C. at the top of the tower to about 130° C. at the bottom of the tower.

References Cited in the file of this patent

UNITED STATES PATENTS 2,519,336     Beach et al. _____ Aug. 22, 1950